US012719574B2

(12) United States Patent
Ho et al.

(10) Patent No.: US 12,719,574 B2
(45) Date of Patent: Aug. 25, 2026

(54) SELF-ALIGNING WINDOW MOUNTED COMMUNICATION APPARATUS

(71) Applicant: T-Mobile USA, Inc., Bellevue, WA (US)

(72) Inventors: Long Ching Macor Ho, Kent, WA (US); Chad Au, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 331 days.

(21) Appl. No.: 18/417,214

(22) Filed: Jan. 19, 2024

(65) Prior Publication Data

US 2025/0240095 A1 Jul. 24, 2025

(51) Int. Cl.

*H04B 10/114* (2013.01)
*H04B 7/155* (2006.01)
*H04B 10/29* (2013.01)

(52) U.S. Cl.

CPC ....... *H04B 10/114* (2013.01); *H04B 7/15528* (2013.01); *H04B 10/29* (2013.01)

(58) Field of Classification Search

CPC .................................................... H04B 10/114

See application file for complete search history.

(56) References Cited

U.S. PATENT DOCUMENTS

| | | | | |
|---|---|---|---|---|
| 11,032,007 B1 * | 6/2021 | Parker | .................... | H04B 10/29 |
| 2018/0294866 A1 * | 10/2018 | Ashworth | .......... | H04B 7/15507 |
| 2021/0298680 A1 * | 9/2021 | Sowards | ................ | A61B 5/065 |
| 2023/0099957 A1 * | 3/2023 | Zhu | ........................ | F16M 11/04<br>396/428 |

* cited by examiner

*Primary Examiner* — Shi K Li

(74) *Attorney, Agent, or Firm* — Lee & Hayes, P.C.

(57) ABSTRACT

A self-aligning window mounted communication apparatus is discussed herein. In some examples, a wireless gateway may comprise a first unit to be mounted outside a window and a second unit to be mounted inside the window. A first unit and a second unit may each include an optical unit, a coupling unit, and a housing unit. A first optical unit may include a magnetic array with polarities of the magnetic elements configured to orient with a second optical unit in a single orientation. The optical unit(s) may be movably coupled with the respective coupling unit(s) so that the optical unit may move with various degrees of freedom and thus, when the first and second units are mounted on a window, the optical units can self-align based on the respective magnetic arrays and the degrees of freedom afforded by the movable coupling with the coupling unit.

20 Claims, 7 Drawing Sheets

SECURE OUTDOOR UNIT ON OUTER SURFACE OF WINDOW (E.G., TEMPORARILY)
702

SECURE INDOOR UNIT ON INNER SURFACE OF THE WINDOW
704

TEST OPTICAL CONNECTION BETWEEN THE OUTDOOR UNIT AND THE INDOOR UNIT
706

OPTICAL CONNECTION QUALITY MEETS OR EXCEEDS THRESHOLD?
708

No

ADJUST THE OUTDOOR UNIT AND/OR THE INDOOR UNIT
710

Yes

USE THE OUTDOOR UNIT AND THE INDOOR UNIT AS ACCESS POINT
712

SELF-ALIGNING WINDOW MOUNTED COMMUNICATION APPARATUS

BACKGROUND

Today many mobile network operators provide high speed wireless internet services to their customers. One concern with mobile network internet services is that customers may experience a degradation of service when in an indoor environment. For instance, structures and walls of a building or home may often attenuate radio signals as the radio signals propagate or pass through. In some cases, customers may deploy outdoor radio frequency repeaters to amplify the radio signals to compensate for the expected attenuation. The outdoor repeater, while emitting an amplified signal, also creates interference for those outdoor users operating on the same frequency. Unfortunately, the radio frequency repeaters often retransmit entire frequency bands and can cause interference with a desired spectrum associated with wireless internet services, thereby reducing reception in outdoor environments. In this manner, the customer often has to choose between poor indoor service or poor outdoor services with respect to their properties. In another instance, the repeater may be placed indoors. However, the quality of the indoor signal may be degraded, with the repeater amplifying a poor-quality signal having low throughput. It is also possible the indoor signal will be degraded to the point where it is incoherent, resulting in the repeater amplifying noise.

A window mounted wireless (wireless standard) gateway system for mitigating radio frequency (RF) signal degradation or attenuation experienced in an indoor environment without introducing interference that may attenuate or degrade outdoor RF signals had been developed. In some cases, a mobile network may provide a wireless internet service via RF signals over a licensed or desired RF spectrum. For example, in some situations, building materials and structures, such as walls, may attenuate the RF signals. The attenuation may cause a degradation of mobile wireless service provided by a mobile network using RF technologies, particularly in the indoor environments. Such a window mounted Wi-Fi gateway system may include two paired units. The first unit may be configured for outdoor use, such as on the exterior of a window, and the second unit may be configured for indoor use, such as on the interior of the window. The outdoor unit may be aligned with the indoor unit, such that the units may communicate with each other via an optical link through the windowpane.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
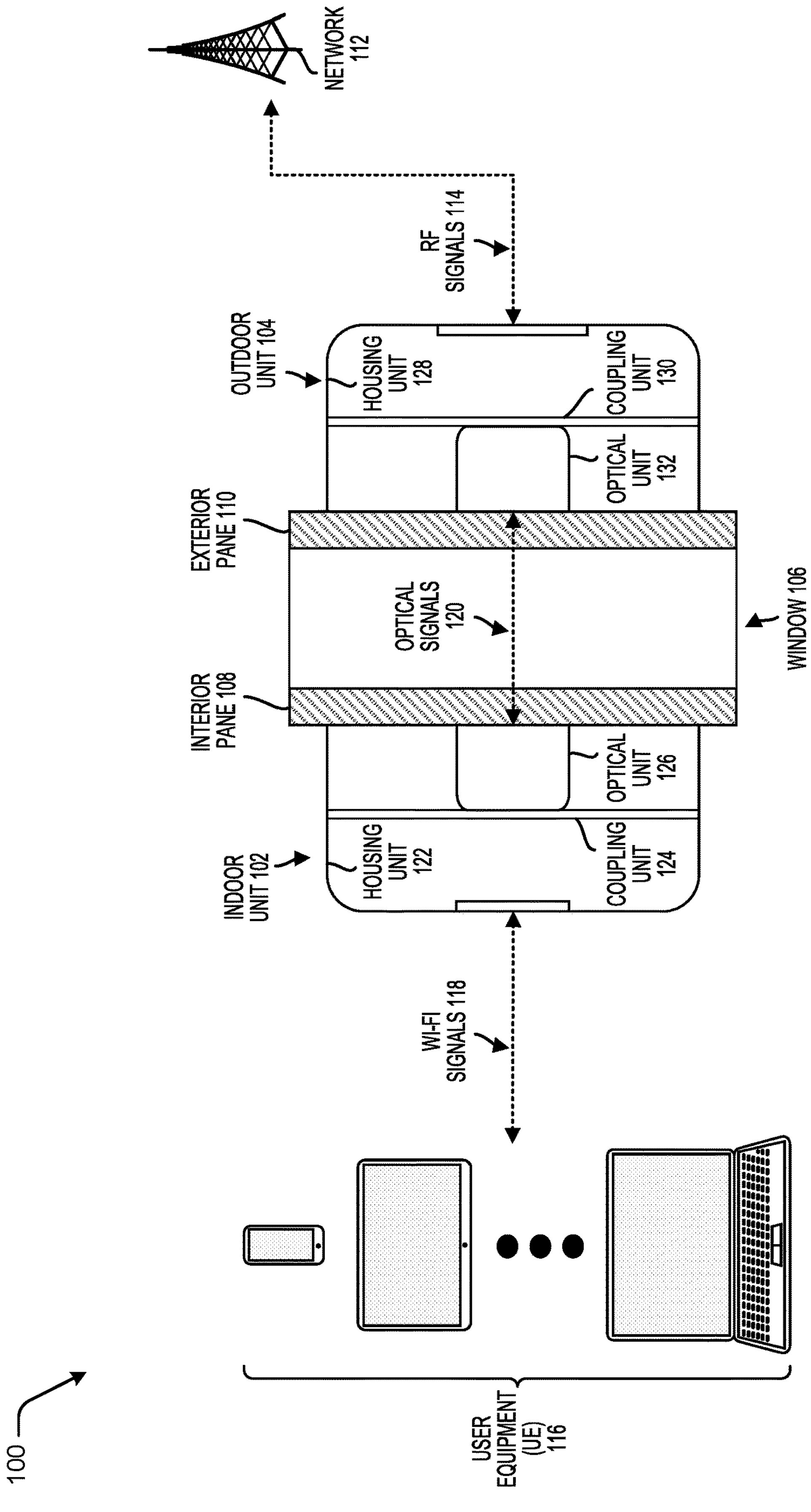
FIG. 1 is an example block diagram of an architecture for a window mounted wireless gateway system, according to some implementations.

A self-aligning window mounted communication apparatus is discussed herein. In some examples a wireless gateway (or wireless access point) may comprise a first unit to be mounted outside a window and a second unit to be mounted inside the window. The first unit may include at least an optical unit, a coupling unit, and a housing unit. The second unit may also include at least a corresponding optical unit, a coupling unit, and a corresponding housing unit. In some examples, the optical unit of the first unit may include a magnetic array with polarity(ies) of the magnetic elements configured to orient with the corresponding optical unit of the second unit to magnetically couple in a single orientation. The optical unit may be movably coupled with the coupling unit so that the optical unit may move in at least one of an x-direction, a y-direction, or a z-direction, and thus, when the first unit is temporarily mounted on an exterior of a window and the second unit is coupled to the first unit on the other side of the window, the optical units can self-align based on the respective magnetic arrays and the degrees of freedom afforded by the movable coupling with the coupling unit. As discussed herein, the system and techniques allow for a self-aligning window mounted wireless gateway for wireless communication with various user equipment.

Although discussed in the context of a window-mounted wireless gateway, the systems and techniques discussed herein are applicable to any apparatus or system for conveying signals through a transparent medium, such as a window.

Further, although discussed in the context of "inside" and "outside" units associated with a window, the disclosure is not intended to be limited to such configurations. For example, the disclosure is applicable to a variety of contexts, such as implementations not involving indoor or outdoor descriptors. In some examples, unit(s) may be under water, underground, or in outer space, or may be used to provide communication link(s) through structural bulkhead(s) or pressure bulkhead(s). Examples were a first unit is located on a first side of a structure or barrier and a second unit is located on a second side of the structure or barrier are contemplated herein.

In general, and as previously noted, a window mounted Wi-Fi gateway system may mitigate radio frequency (RF) signal degradation or attenuation experienced in an indoor environment without introducing interference that may attenuate or degrade outdoor RF signals. In some cases, a mobile network may provide a wireless internet service via RF signals over a licensed or desired RF spectrum. For example, in some situations, building materials and structures, such as walls, may attenuate the RF signals. The attenuation may cause a degradation of mobile wireless service provided by a mobile network using RF technologies, particularly in the indoor environments.

In some implementations, the window mounted Wi-Fi gateway system may include two paired units. The first unit may be configured for outdoor use, such as on the exterior of a window, and the second unit may be configured for indoor use, such as on the interior of the window. The outdoor unit may be aligned with the indoor unit, such that the units may communicate with each other via an optical transmission through the windowpane. The optical units can comprise optical sensor(s) with a single sensor configured to transmit and receive data, while in some cases the optical units can comprise dual optical sensors to transmit and receive data separately. In either case, the optical unit may require precise alignment (e.g., on the order of millimeters or sub-millimeters) to allow for optimal signal transmission through the transparent medium (e.g., the window).

As an illustrative example, the outdoor unit may include one or more antennas and a wireless modem for receiving and decoding the RF signals (e.g., the network wireless transmission broadcast, for instance, from one or more network towers, small cells, or other wireless network infrastructure). The system may convert the decoded RF signals into an optical-based signal that may be transmitted by a transmitter through the glass to an aligned or paired receiver in the indoor unit. The indoor unit may then convert the optical-based signal into a wired and/or wireless indoor signal which may be distributed throughout the indoor environment, via a router, to a user equipment (UE). The indoor unit may receive a wireless signal (such as a response signal) from the UE at the router within the indoor environment. The indoor unit may then convert the wireless signal to an optical-based signal and transmit through the windowpane back to a receiver in the outdoor unit. The outdoor unit may convert the optical-based signal to an RF signal and transmit or send the user's data packet to a destination over the network.

In this manner, unlike conventional RF repeaters that amplify the RF signals that may interfere with the spectrum associated with wireless internet services and may reduce reception in outdoor environments, the window mounted Wi-Fi gateway system provides for indoor home network or modem services without interfering with outdoor performance of the mobile network. Examples of a window-mounted wireless gateway are provided in U.S. application Ser. No. 18/232,486, filed Aug. 10, 2023. Application Ser. No. 18/232,486 is hereby incorporated by reference in its entirety and for all purposes.

In some examples, the optical unit may comprise a magnetic array configured to couple to the corresponding optical array. In some examples, the polarity of individual magnetic elements in the magnetic array may be configured such that there is a single orientation to couple the corresponding optical units. As noted herein, in some examples, the optical units may be moveably coupled to a coupling unit, which may in turn be coupled to a housing unit. The housing unit(s) may further comprise magnetic array(s) to couple the housing units together. In some examples, one housing unit may include a magnetic array with magnets whereby all magnets present a North ("N") orientation towards the window, while the other housing unit may include a magnetic array whereby all magnets present a South ("S") orientation towards the window, such that the housing units are coupled together regardless of orientation. In some examples, the magnetic arrays of the housing units may be configured such that only a single orientation is possible to couple the two corresponding housing units.

In some implementations, the coupling unit and the housing may be a single unit, and in some examples, the coupling unit may be rigidly coupled with the housing unit. In some examples, the optical unit is movably coupled with the coupling unit such that the optical unit is configured to move in at least one of an x-direction, a y-direction, and/or a z-direction. Thus, the optical units may move relative to the coupling unit and/or the housing unit to allow for self-alignment when mounting the two units to form the window mounted wireless gateway.

In some examples, a desired number of magnets may be distributed and permanently glued in place around the perimeter of the optical unit base plate. As described herein, these magnets will help to pull the outdoor unit and the indoor unit into their relative positions during the installation process onto a window. A polarity of each magnetic array may be configured to allow for a single orientation when the indoor unit and the outdoor unit are properly aligned. In other examples, the group of magnets may be consistent, e.g., all those along one side are N, while those along the other side may be S, to ensure proper orientation of the first unit relative to the second unit.

In some examples, the outdoor unit wireless power coupler coils may be placed around the optical unit to make efficient use of the device real estate. Note the optical units may also be located outside of the coils if the application requires. Any necessary adjustments may be made to these coils to maximize power coupling efficiency with those for the indoor unit. The coils may be glued in place. In implementations, the magnets May be located inwards of the coils in the vicinity of the optical units. This may allow for minimizing the base plate footprint to the size of the coils.

FIG. 1 is an example block diagram of an architecture for a window mounted wireless (Wi-Fi) gateway system 100 (also referred to as a wireless access point 100) according to some implementations. In some examples, the window mounted Wi-Fi gateway system 100 includes an indoor unit 102 and an outdoor unit 104. The indoor unit 102 and the outdoor unit 104 may be aligned on opposing sides (e.g., the interior and exterior, respectively) of window 106 having one or more panes of glass (or other transparent material), such as an interior pane 108 and an exterior pane 110 illustrated in the current example. The alignment may be configured such that one or more transmitters operating in multiple frequency bands of the indoor unit 102 align with one or more receivers of the outdoor unit 104 (also referred to as an "exterior unit 104") and one or more receivers of the indoor unit 102 align with one or more transmitters of the exterior unit 104. For instance, an optical receiver of the indoor unit 102 may align with an optical transmitter of the outdoor unit 104 and an optical receiver of the outdoor unit 104 may align with an optical transmitter of the indoor unit 102.

As discussed herein, and in some examples, the outdoor unit 104 may comprise a single or multiple optical sensor(s) that can transmit and receive data to and from a single or multiple optical sensor(s) associated with the indoor unit 102.

In the current example, the outdoor unit 104 may be in wireless communication with a network 112, such as a mobile network (or a base station such as an eNodeB or a gNodeB) providing high speed wireless internet services to an end-user. In this manner, the outdoor unit 104 may be configured to receive incoming data via RF signals 114 received from the network 112 and to transmit outgoing data via RF signals 114 sent to the network 112. Likewise, the indoor unit 102 may be in wireless communication with one or more UEs 116, such as smart phones, televisions, smart appliances, tablets, personal computers, routers, modems, wearable devices, Internet of Things ("IoT") devices, and the like associated with the end-user. In this manner, the indoor unit 102 may be configured to receive outgoing data via wireless signals 118 received from the UEs 116 and to transmit incoming data via wireless signals 118 sent to the UEs 116.

In some examples, the network 112 can be configured to communicate via any wireless protocol, including but not limited to, 2G, 3G, 4G, 4G LTE, 5G, Wi-Fi, Bluetooth, Bluetooth Low Energy, Long Range Wide Area Network (LoRaWAN), RFID, and the like.

In some cases, the alignment between the indoor unit 102 and the outdoor unit 104 may be configured to accommodate one or more coatings applied to the window 106 (e.g., a low-energy coating, tint, argon gas layer, or the like). In this manner, the system 100 may be configured to provide an installation or set-up assistant, such as via a paired downloadable application on a UE 116. For instance, as one illustrative example, a user may apply or adhere the exterior unit 104 to an exterior of a window 106 of their home environment. The user may also download an application to the UE 116. The user may also pair the application hosted on the UE 116 to the interior unit 102 (such as over a home network, Bluetooth, or the like).

The application may then test the alignment of the indoor unit 102 and the outdoor unit 104 to determine if the connection quality of the optical signals 120 meets or exceeds a threshold (e.g., for bandwidth, signal-to-interference-plus-noise ratio (SINR), etc.).

In some examples, the indoor unit 102 and/or the outdoor unit 104 may execute a program to test or otherwise verify a quality of the optical connection between the indoor unit 102 and the outdoor unit 104. In some examples, the application may be initiated and may provide a binary indication of whether the connection quality meets or exceeds a threshold quality level. By way of example and without limitation, the indoor unit 102 may include a button that, when pressed, causes execution of the connection quality testing application and outputs a result of the test as a binary indication (e.g., the indoor unit 102 can illuminate a green LED to indicate the test is passed or a red LED to indicate the test has failed).

As FIG. 1 further illustrates, the indoor unit 102 may comprise a housing unit 122, a coupling unit 124, and an optical unit 126. In some examples, the optical unit 126 may be movably coupled to the coupling unit 124 with one or more degrees of freedom in the x-direction, the y-direction, and/or in the z-direction. In some examples, the coupling unit 124 can be rigidly coupled with the housing unit 122, and in some examples, the coupling unit 124 and the housing unit 122 can be integrated as a single unit.

As further illustrated, the outdoor unit 104 includes a corresponding housing unit 128, a coupling unit 130, and an optical unit 132. Similar to the indoor unit 102, in some examples, the optical unit 132 may be movably coupled to the coupling unit 130 with one or more degrees of freedom in the x-direction, the y-direction, and/or in the z-direction. In some examples, the coupling unit 130 can be rigidly coupled with the housing unit 128, and in some examples, the coupling unit 130 and the housing unit 128 can be integrated as a single unit.

Additional details of the relationship between the housing unit(s), the coupling unit(s) and the optical unit(s) are discussed in FIGS. 3, 4A, 4B, 5, 6A, and 6B, as well as throughout this disclosure.

Figure 2:
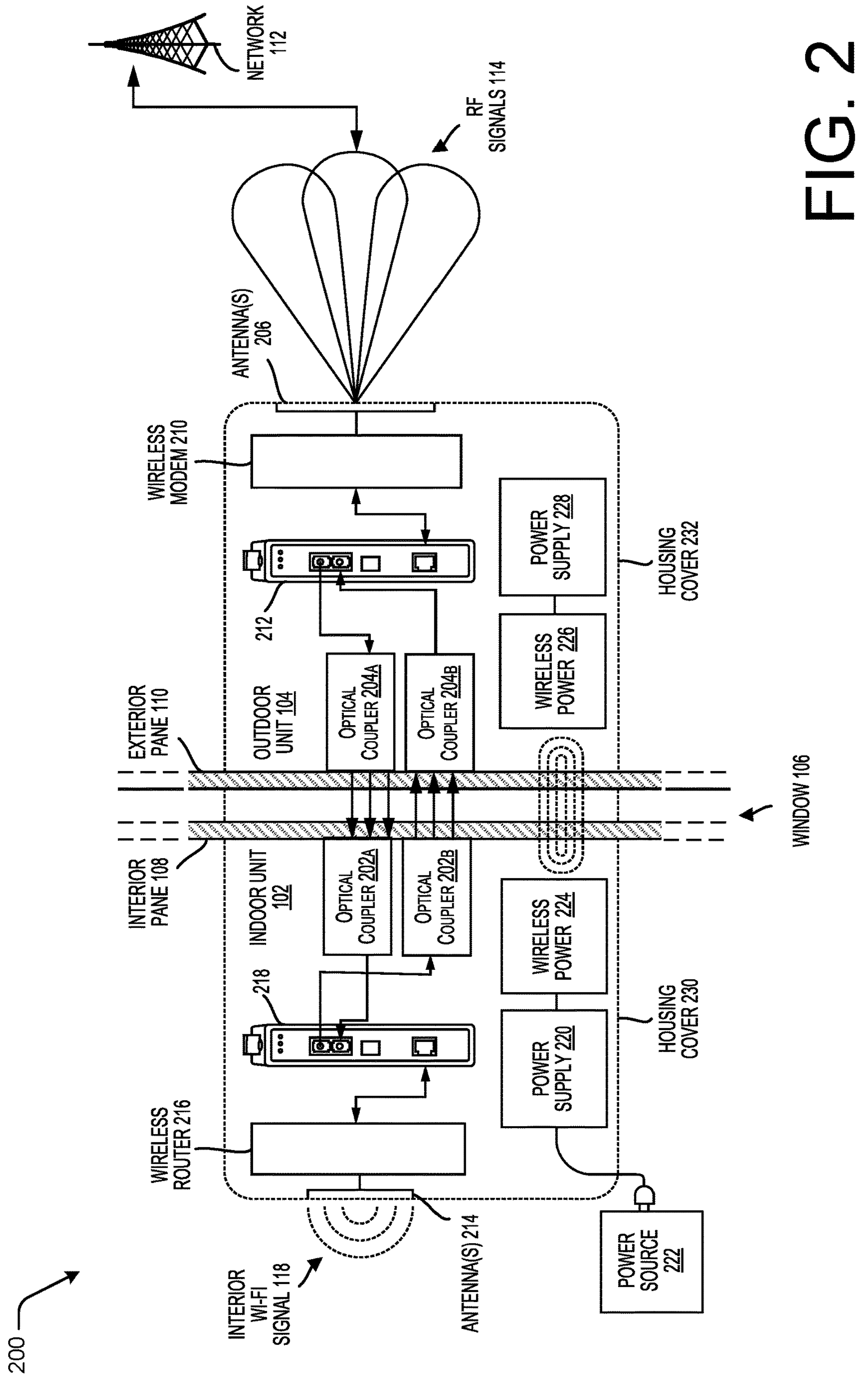
FIG. 2 is another example block diagram of an architecture for a window mounted wireless gateway system, according to some implementations.

FIG. 2 is an example block diagram of an architecture for a window mounted wireless (Wi-Fi) gateway system 200 according to some implementations. In the current example, the window mounted Wi-Fi gateway system 200 includes the indoor unit 102 and the outdoor unit 104. As previously described, the indoor unit 102 and the outdoor unit 104 may be aligned (as described with respect to FIG. 1) on opposing sides (e.g., the interior and exterior, respectively) of the window 106 having one or more panes of glass (such as the interior pane 108 and the exterior pane 110 illustrated in the current example).

The alignment may be configured such that a first optical coupler 202*a* (or transducer, collimator, detector, or the like) of the indoor unit 102 aligns with a first optical coupler 204*a* (or transducer, collimator, laser, or the like) of the exterior unit 104, such that data may be transmitted from the first optical coupler 204*a* of the exterior unit 104 to the first optical coupler 202*a* of the indoor unit 102. Likewise, a second optical coupler 202*b* of the indoor unit 102 aligns with a second optical coupler 204*b* of the exterior unit 104, such that data may be transmitted from the second optical coupler 202*b* of the indoor unit 102 to the second optical coupler 204*b* of the exterior unit 104. For instance, the optical couplers 202*a* and 202*b* may output the data as an optical-based signal that may be received by the optical couplers 204*a* and 204*b*, respectively. While FIG. 2 illustrates two optical coupler pairs (202*a*, 204*a*; 202*b*, 204*b*), it is to be understood that the example of FIG. 2 may include one or multiple optical coupler pair(s).

The outdoor unit 104 may also include one or more antenna(s) 206 positioned with respect to an antenna aperture. The antenna(s) 206 may be coupled to one or more wireless modem(s) 210 and/or media converter 212. The wireless modem(s) 210 may be configured to decode the RF signals received by the antennas 206 from one or more networks, such as network 112 of FIG. 1. The wireless modem 210 and/or media converter 212 may be in electronic communication with the optical couplers 204*a* and 204*b*. In the current example, the antenna 206 may be a beam forming antenna that may direct the coverage of the system 200 in a desired direction or configuration with respect to the network 112.

In the current example, the antenna(s) 206 may be configured to provide beam forming to improve signal reception and/or transmission with respect to omnidirectional antenna responses and the RF signals 114. In some cases, the antenna(s) 206 may include multiple antennas that are configured to have adjustable phase and amplitude to generate beam or focused area of coverage. In the focused area of coverage, the antenna(s) 206 may provide increased signal strength and/or range, improved signal quality, and otherwise enhanced network capabilities. In these examples, the antenna(s) 206 may be adjusted to have a beam shaped in the direction of a nearest proximate cellular tower or the like.

The indoor unit 102 may include one or more antenna(s) 214 positioned with respect to an antenna aperture. The antenna(s) 214 may be coupled to a wireless router 216. The wireless router 216 of the indoor unit 102 may be configured to decode the interior Wi-Fi signals 118 received by the antenna(s) 214 from, for instance, a UE within the interior environment. The wireless router 216 may be in electronic communication with the optical couplers 202*a* and 202*b*.

In some examples, the wireless router 216 may be coupled to one or more UEs or other routers or switches via a wired connection, such as a fiber-optic cable, an ethernet cable, a coaxial cable, and the like.

In the current example, the indoor unit 102 may include one or multiple converter 218 (such as a media converter or the like) to decode and/or translate interior Wi-Fi signals 118 (such as representative of media files) and/or signals (such as representative of media files) received from the optical coupler 202*a* prior to delivering to the wireless router 216. Likewise, the outdoor unit 104 may include the converter(s) 212 (such as a media converter or the like) to decode and/or translate RF signals 114 (such as representative of media files) and/or signals (such as representative of media files) received from the optical coupler 204*a*.

As described with respect to FIG. 2, the indoor unit 102 may also include a power supply 220 that may be coupled to a power source 222 (such as an outlet in the interior environment). The power supply 220 may provide power to the indoor unit 102 and act (or otherwise function) as a power source for the outdoor unit 104. For instance, the power supply 220 may be coupled to a wireless power transmitter 224 to output a power signal such as an inductive power supply signal. The outdoor unit 104 may be equipped with a wireless power receiver 226 that may be charged by or capture the inductive power supply signal. The wireless power receiver 226 may be coupled to a power supply 228 of the outdoor unit 104. In implementations, the wireless power transmitter 224 and wireless power receiver 226 may be in the form of cooperating coils. The indoor unit 102 may include a housing cover 230 and the outdoor unit 104 may include a housing cover 232. In some examples, the housing cover 230 may correspond to the housing unit 122, and in some examples, the housing cover 232 may correspond to the housing unit 128.

Figure 3:
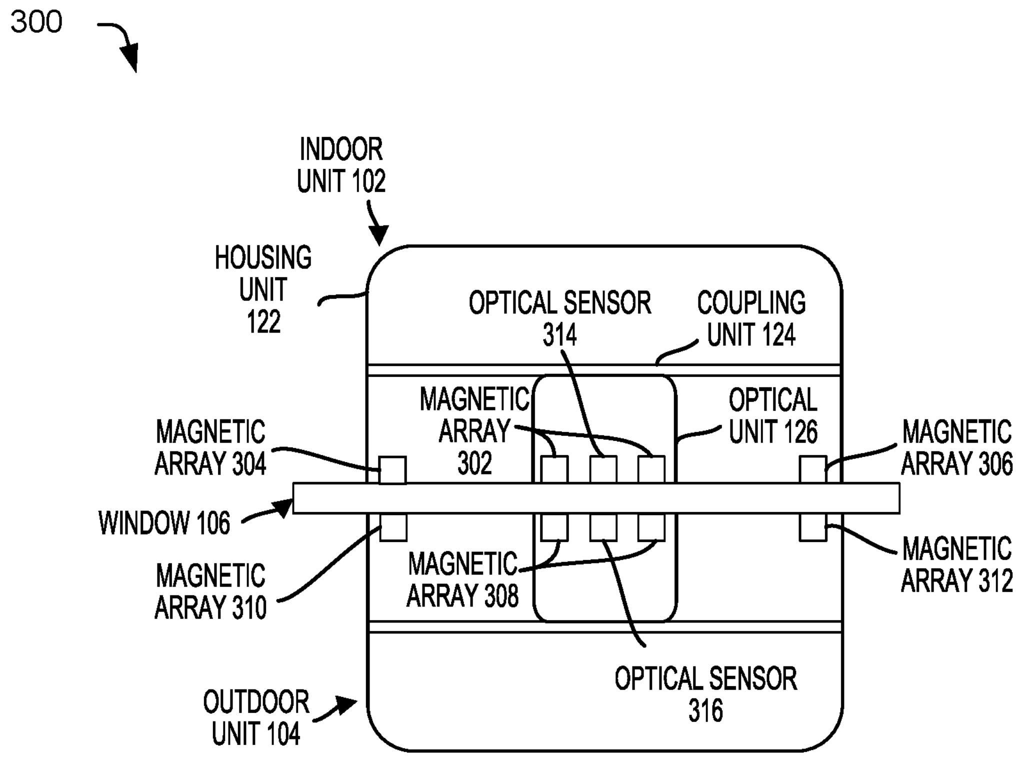
FIG. 3 is a block diagram of a detail of a window mounted wireless gateway system including optical unit(s), coupling unit(s), and housing unit(s), according to some implementations.

FIG. 3 is a block diagram of a detail of a window mounted wireless gateway system 300 including optical unit(s), coupling unit(s), and housing unit(s), according to some implementations.

As illustrated, FIG. 3 shows the indoor unit 102 coupled with the outdoor unit 104 across the window 106. The indoor unit 102 comprises the housing unit 122, the coupling unit 124, and the optical unit 126. For ease of illustration, the corresponding housing unit, the coupling unit, and the optical unit in the outdoor unit 104 are unlabeled in FIG. 3.

The indoor unit 102 and the outdoor unit 104 are coupled together via the magnetic arrays 302, 304, and 306 coupled with corresponding magnetic arrays 308, 310, and 312, respectively. In some examples, the optical unit 126 can comprise an optical sensor 314 and the magnetic array 302. In some examples, the housing unit 122 can comprise the magnetic arrays 304 and 306.

In some examples, the magnetic array 302 can couple with the magnetic array 308 to cause the respective optical units 126 to self-align such that the optical sensor 314 can send and/or receive data to and from the optical sensor 316 of the outdoor unit 104. As discussed throughout this disclosure (and as illustrated further in FIGS. 6A and 6B), the magnetic array 302 (and the corresponding magnetic array 308) can comprise magnets with particular polarity orientations such that the indoor unit 102 can properly couple with the outdoor unit 104 in a single orientation.

In some examples, the magnetic array 304 can couple with the magnetic array 310 and the magnetic array 306 can couple with the magnetic array 312. As discussed in connection with FIGS. 4A and 4B, the optical unit 126 can be movably coupled with the coupling unit 124 (and accordingly, with the housing unit 122) such that the optical unit 126 may have various degrees of freedom in the x-direction, the y-direction, and/or in the z-direction to aid in the self-alignment process for coupling the indoor unit 102 and the outdoor unit 104.

In some examples, individual magnets of the magnetic array 302, 304, 306, 308, 310, and/or 312 can comprise permanent magnets, electromagnets, ceramic magnets, neodymium magnets, samarium cobalt magnets, alnico magnets, ferrite magnets, and the like.

Figure 4A:
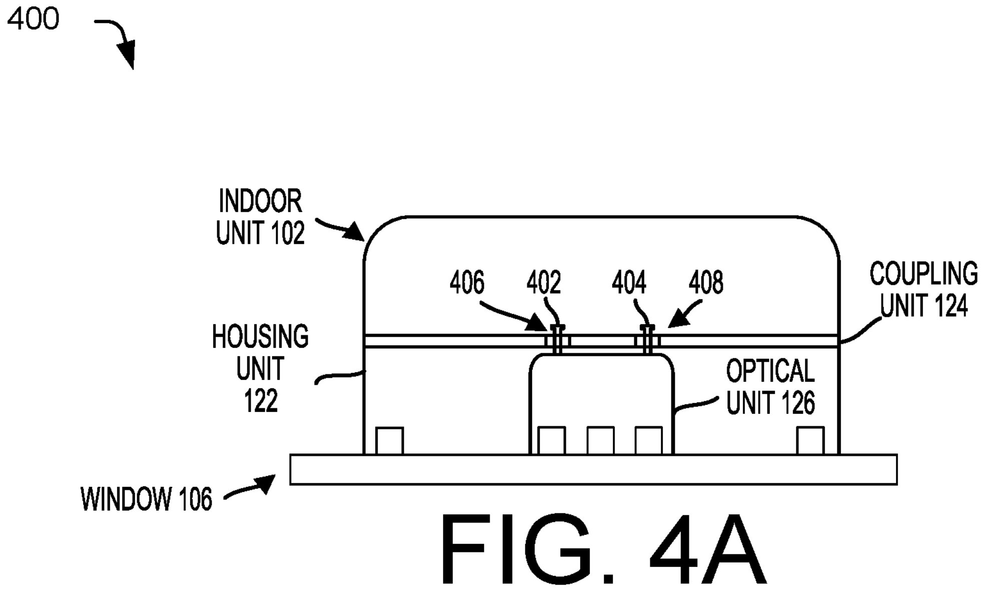
FIG. 4A is a block diagram of a portion of a window mounted wireless gateway system with the optical unit movably coupled to the coupling unit, according to some implementations.

FIG. 4A is a block diagram 400 of a portion of a window mounted wireless gateway system with the optical unit movably coupled to the coupling unit, according to some implementations.

The optical unit 126 can be movably coupled to the coupling unit 124 via screws 402 and 404 screwed into the optical unit 126 through corresponding holes 406 and 408. In some examples, a diameter of the shank of the screw (e.g., 402 and 404) is less than a diameter of the hole (e.g., 406 and 408) to provide degrees of freedom in the x-direction and/or the y-direction. Further, in some examples, the length of the screw is sized so that there may be vertical movement of the screw (e.g., 402 and 404) in the z-direction. Accordingly, the optical unit 126 may be movably coupled with the coupling unit 124 to provide degrees of freedom in one or more of the x-direction, the y-direction, and/or the z-directions. This allows the optical unit 126 to self-align with the corresponding optical unit to align the indoor unit 102 and the outdoor unit 104. Of course, the optical unit 126 can be movably coupled to the coupling unit 124 via other means, and the illustration in FIG. 4A is not intended to be limiting.

Figure 4B:
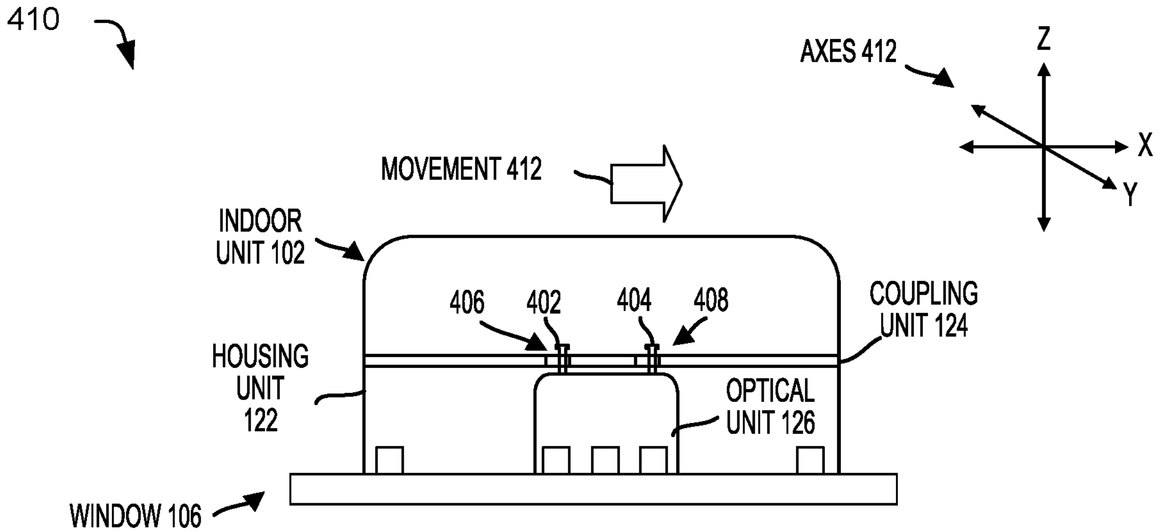
FIG. 4B is a block diagram of a portion of a window mounted wireless gateway system with movement in at least one of an x-direction, a y-direction, or a z-direction, according to some implementations.

FIG. 4B is a block diagram 410 of a portion of the window mounted wireless gateway system with movement in at least one of an x-direction, a y-direction, or a z-direction, according to some implementations.

As illustrated, the housing unit 122 of the indoor unit 102 remains in a fixed position with respect to FIGS. 4A and 4B. However, because the optical unit 126 is movably coupled with the coupling unit 124, the optical unit 126 is allowed to self-align with the corresponding optical unit in the outdoor unit 104. The optical unit 126 has shifted in at least the x-direction in FIG. 4B, relative to the position in FIG. 4A, as illustrated by movement 412. Of course, the optical unit 126 may move in one or more of an x-direction, a y-direction, and/or a z-direction (as illustrated with the axes 412 for reference), depending on the particular implementation. In some examples, movement in one or more directions may be on the order or millimeters or centimeters, although implementations may vary.

Figure 5:
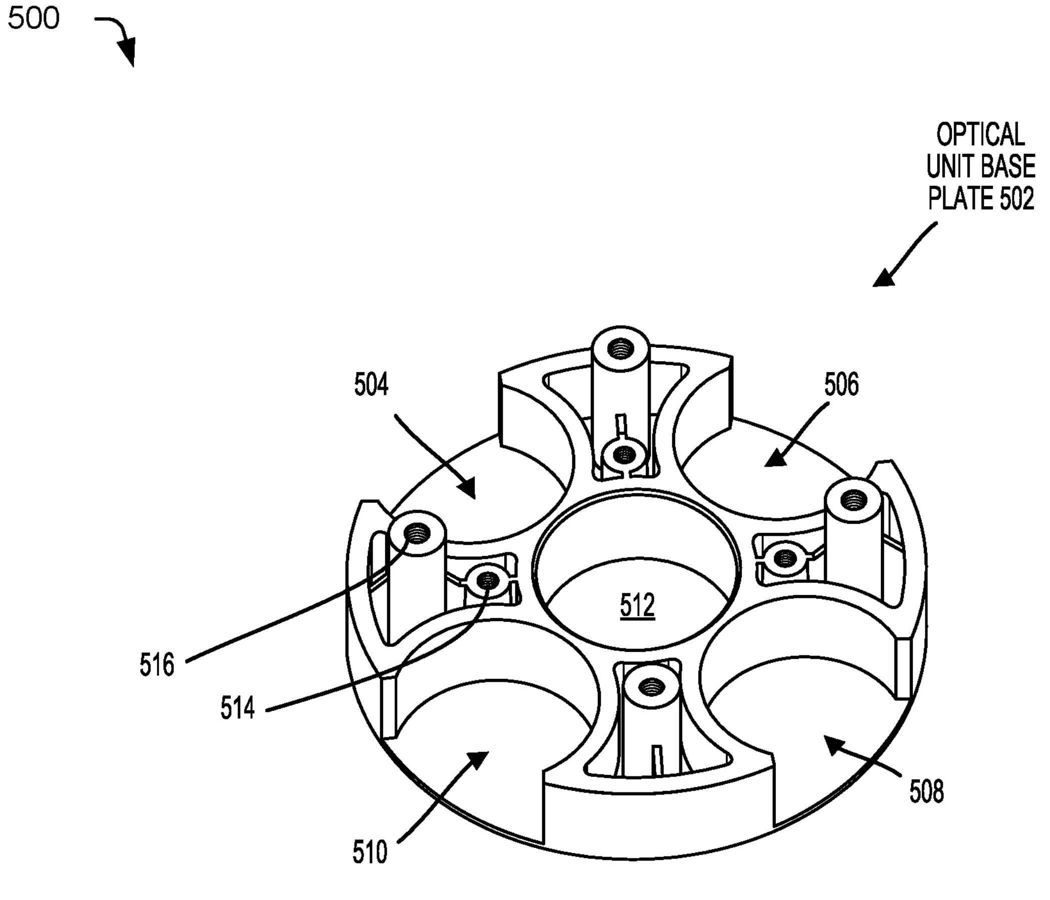
FIG. 5 is a perspective view of an optical unit base plate for holding an optical sensor and a magnetic array, according to some implementations.

FIG. 5 is a perspective view 500 of an optical unit base plate 502 for holding an optical sensor and a magnetic array, according to some implementations.

In some examples, the optical unit base plate 502 can be substantially circular with recessed areas 504, 506, 508, and 510 formed to hold individual magnets. The individual magnets installed in the recessed areas 504, 506, 508, and 510 of the optical unit base plate form a magnetic array, as discussed herein. The recessed areas 504, 506, 508, and 510 can be distributed symmetrically about an opening 512 that is configured to support an optical sensor installed in the base plate 502.

The optical unit base plate 502 includes threaded inserts 514 and 516. In some examples, the first set of threaded inserts 514 is configured to secure an optical sensor and/or other electronics (e.g., associated with wireless power components 224 or 226) to the base plate 502. In some examples, the second set of threaded inserts 516 is configured to movably couple the optical unit base plate 502 to the coupling plate (e.g., 124 or 130), as discussed herein.

In some examples, the base plate 502 can be manufactured out of plastic or other material, and in some examples, the base plate 502 can be magnetically inert (e.g., the base plate 502 can be manufactured by a material that is not magnetic and that does not interact with magnetic fields).

Figure 6A:
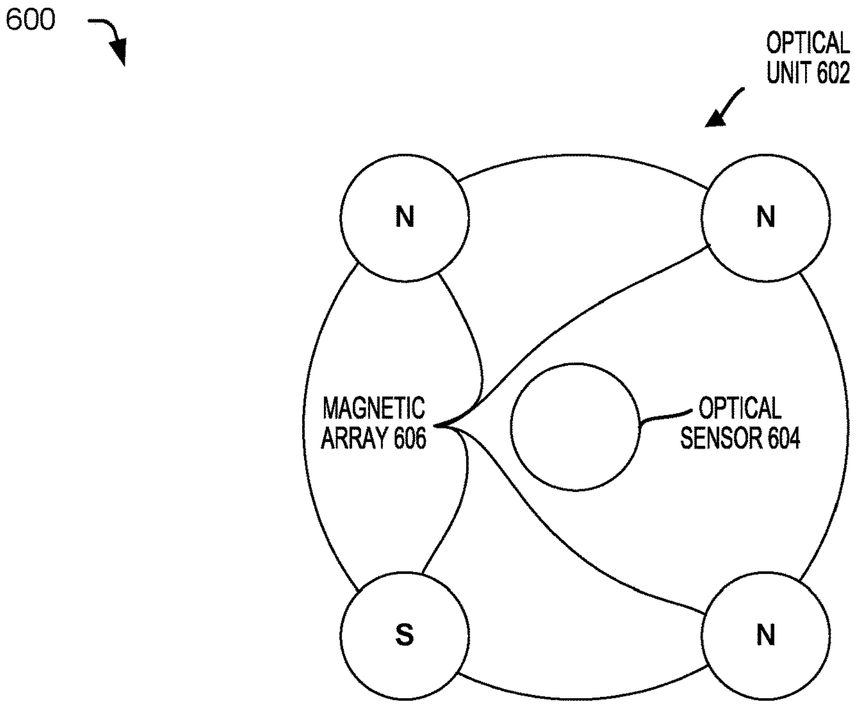
FIGS. 6A and 6B are block diagrams of the interior and exterior optical units with magnetic arrays configured to couple together in a single orientation, according to some implementations.
Figure 6B:
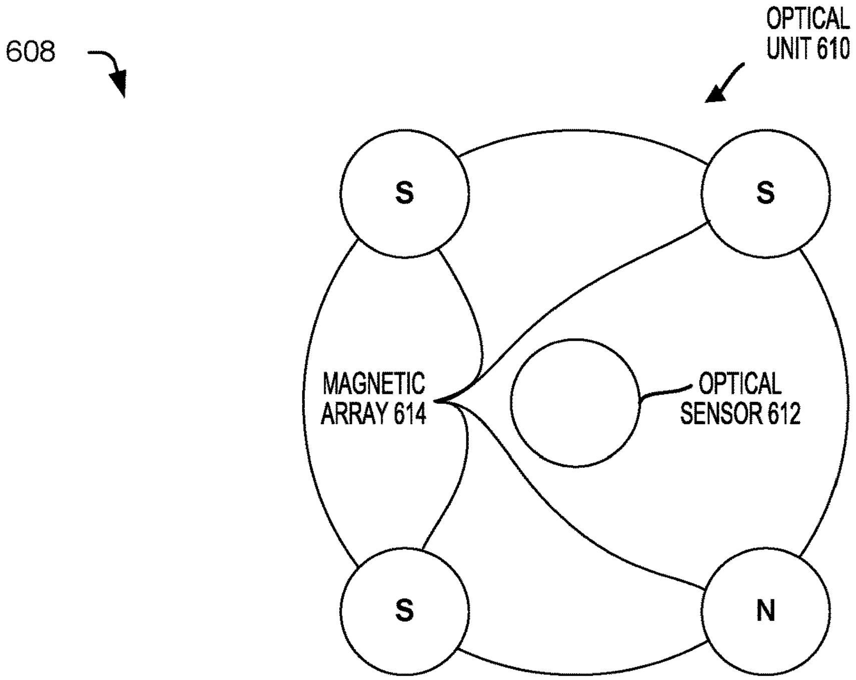

FIGS. 6A and 6B are block diagrams of the interior and exterior optical units with magnetic arrays configured to couple together in a single orientation, according to some implementations.

In some examples, FIG. 6A illustrates block diagram 600 of a plan view of an optical unit 602. In some examples, the optical unit 602 corresponds to the optical unit 126 of the indoor unit 102, and in some examples, the block diagram 600 illustrates a portion of the optical unit 126 in contact with the interior pane 108 of the window 106. As illustrated, the optical unit 602 includes an optical sensor 604 with magnetic array 606 including magnets symmetrically disposed about the optical sensor 604. As illustrated, individual magnets of the magnetic array 606 are designated with a polarity "N" or "S" corresponding to "North" and "South" magnetic orientations.

FIG. 6B illustrates a block diagram 608 of a plan view of an optical unit 610. In some examples, the optical unit 610 corresponds to the optical unit 132 of the outdoor unit 104, and in some examples, the block diagram 608 illustrates a portion of the optical unit 132 in contact with the exterior pane 110 of the window 106. As illustrated, the optical unit 610 includes a corresponding optical sensor 612 and a corresponding magnetic array 614. In some examples, the magnetic array 614 is configured with magnetic polarities to properly couple with the magnetic array 606 in a single orientation.

In some examples, the number, type, configuration, and orientation of individual elements of the magnetic arrays 606 and 614 are merely illustrative and are not intended to be limiting. Other configurations are considered within the scope of this disclosure.

Figure 7:
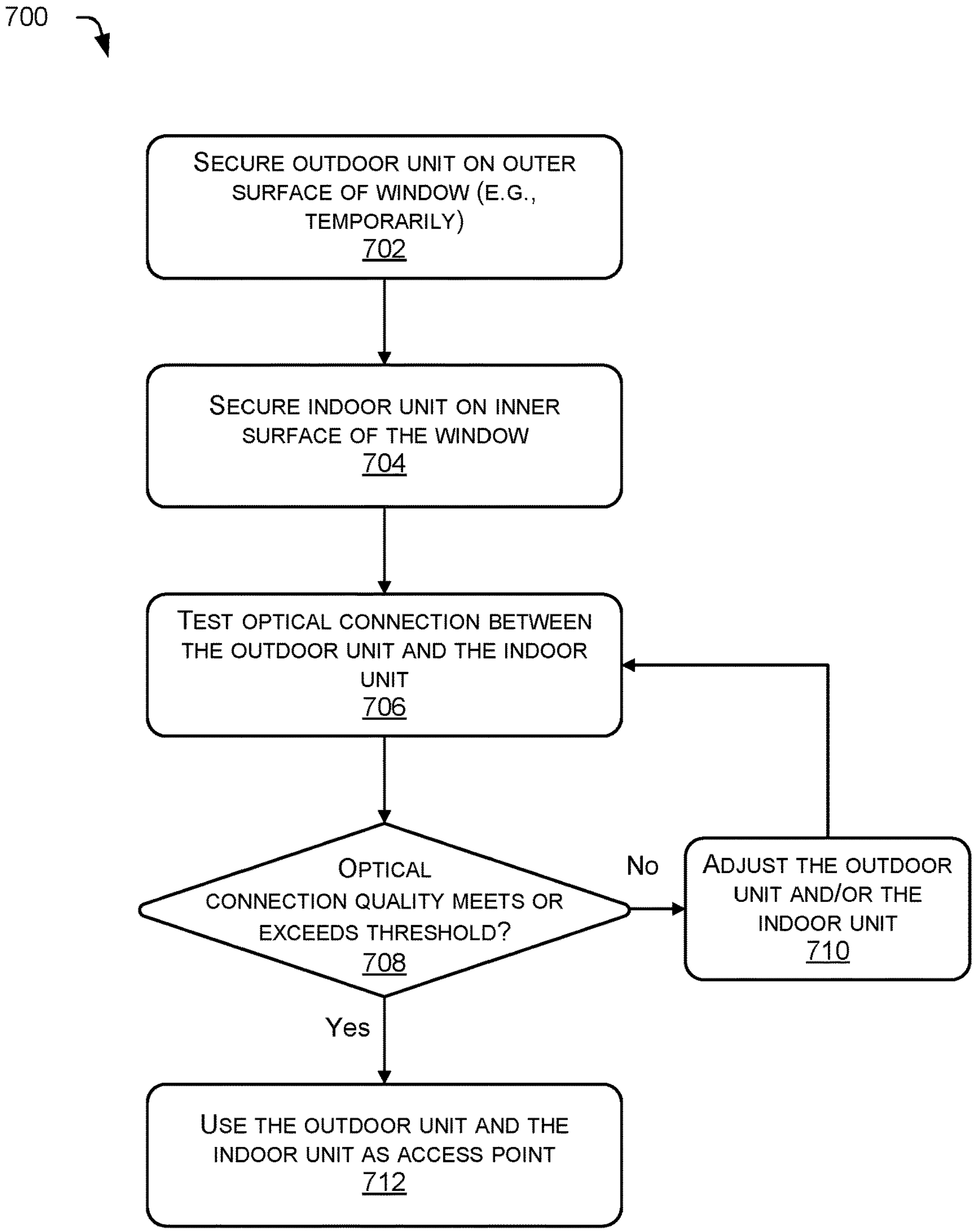
FIG. 7 is a flow diagram illustrating an example process associated with installing a window mounted wireless gateway system, according to some implementations.

FIG. 7 is a flow diagram illustrating an example process 700 associated with installing a window mounted wireless gateway system, according to some implementations. The process is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be implemented or executed. For discussion purposes, the processes herein are described with reference to the frameworks, architectures and environments described in the examples herein, although the processes may be implemented in a wide variety of other frameworks, architectures or environments.

At operation 702, the process may include securing an outdoor unit on an outer surface of a window (e.g., temporarily). In some examples, the operation 702 may include temporarily fixing the outdoor unit (e.g., the outdoor unit 104) to an outer surface (e.g., 110) of a window (e.g., 106). This operation 702 may include using tape or other adhesive means to secure the outdoor unit.

At operation 704, the process may include securing an indoor unit on an inner surface of the window. In some examples, the operation 704 may include placing the indoor unit (e.g., the indoor unit 102) on an interior surface (e.g., 108) of the window (e.g., 106) to couple the indoor unit (e.g., 102) with the outdoor unit (e.g., 104). Because of the configuration discussed herein, the respective optical units (e.g., 126 and 132) may self-align based on the magnetic arrays and based on the degrees of freedom provided by the movable coupling between the optical unit and the corresponding coupling unit.

In some examples, the operation 704 can include coupling the optical units and the housing units at the same time, and in some examples, the optical units can be aligned first, followed by aligning the housing units. In some examples, because of the degrees of freedom afforded the optical units, the optical units will naturally self-align and couple prior to the housing units aligning and coupling.

At operation 706, the process may include testing an optical connection between the outdoor unit and the indoor unit. In some examples, the operation 706 can include testing one or more of a bandwidth, signal strength, SINR, number of dropped or un-dropped packets, etc. of the optical connection between the indoor unit and the outdoor unit. In some examples, the operation 706 can include testing the uplink and downlink connections separately or together.

At operation 708, the process may include determining whether the optical connection quality meets or exceeds a threshold. In some examples, the threshold can be a static threshold and in some examples, the thresholds can be based in part on an estimated window size (e.g., thickness), material, etc.

If the optical connection quality does not meet or exceed a threshold (e.g., "no" in operation 708), the process can proceed to operation 710 which can include adjusting the outdoor unit and/or the indoor unit. In some examples, the operation 710 can include outputting an indication (e.g., for a use) to instruct the use to adjust the outdoor unit and/or the indoor unit. In some examples, the operation 710 can include testing the optical connection during the adjusting operation to provide instantaneous feedback to a user regarding the connection quality.

If the optical connection quality does meet or exceed a threshold (e.g., "yes" in operation 708), the process can proceed to operation 712, which may include using the outdoor unit and the indoor unit as an access point. As can be understood in the context of the disclosure, when the indoor unit and the outdoor unit are properly aligned, the outdoor unit 104 can communicate with the network 112 and/or the indoor unit 102 to facilitate wireless communications with user equipment communicatively coupled with the indoor unit 102, as discussed herein.

Accordingly, unlike conventional repeaters, the window mounted wireless gateway system extends the mobile internet coverage indoors without introducing interference in the outdoor environment.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A wireless access point for wireless communications, the wireless access point comprising:

a first optical unit configured to couple to a first side of a transparent material, the first optical unit comprising:

a first optical sensor configured to communicate optically with a second optical sensor positioned on a second side of the transparent material; and a first magnetic array to magnetically couple with a second magnetic array positioned on the second side of the transparent material, wherein the first magnetic array and the second magnetic array are configured to couple together in a first single orientation;

a first coupling unit configured to couple the first optical unit to a first housing unit, the first coupling unit comprising a third magnetic array to magnetically couple with a fourth magnetic array positioned on the second side of the transparent material, wherein the third magnetic array and the fourth magnetic array are configured to couple together in a second single orientation; and a second optical unit configured to couple to the second side of the transparent material, the second unit comprising:

the second optical sensor; and the second magnetic array.

2. The wireless access point of claim 1, wherein a relative position of the first unit and the second unit coupled in the single orientation is defined by orientations of individual magnetic elements of the first magnetic array and individual magnetic elements of the second magnetic array.

3. The wireless access point of claim 1, wherein the first coupling unit is movably coupled to the first optical unit in at least one of an x-direction, a y-direction, or a z-direction.

4. The wireless access point of claim 1, wherein the first coupling unit is rigidly coupled to the first housing unit.

5. The wireless access point of claim 1, further comprising a second coupling unit configured to couple the second optical unit to a second housing unit, the second coupling unit comprising the fourth magnetic array.

6. The wireless access point of claim 1, further comprising a wireless power receiver coupled to the first housing unit, the wireless power receiver configured to receive power from the second optical unit for operating the first optical unit.

7. The wireless access point of claim 1, wherein the transparent material is a window, and the first optical unit is mounted on an outside surface of the window and the second optical unit is mounted on an inside surface of the window.

8. The wireless access point of claim 1, wherein the first optical sensor is configured to receive and transmit data to and from the second optical sensor.

9. The wireless access point of claim 1, wherein the first magnetic array is disposed symmetrically about the first optical sensor.

10. The wireless access point of claim 1, wherein:

the first optical unit further comprises:

a wireless power receiver to capture power from a wireless charging signal;

a first power supply coupled to the wireless power receiver to store power; and the second optical unit further comprises:

a second power supply electronically coupled to a power source; and a wireless power transmitter to output the wireless charging signal; and power is wirelessly transmitted from the wireless power transmitter to the wireless power receiver via the wireless charging signal when the first unit and second unit are properly aligned.

11. The wireless access point of claim 1, the first optical unit further comprising:

an antenna to wirelessly communicate with a base station to provide a signal to one or more devices electronically coupled to the second unit.

12. A system comprising:

a first optical unit configured to couple to a first side of a transparent material, the first optical unit comprising:

a first optical sensor configured to communicate optically with a second optical sensor of a second optical unit positioned on a second side of the transparent material; and a first magnetic array to magnetically couple with a second magnetic array positioned of the second unit on the second side of the transparent material, wherein the first magnetic array and the second magnetic array are configured to couple together in a first single orientation; and a first coupling unit configured to couple the first optical unit, the first coupling unit comprising a third magnetic array to magnetically couple with a fourth magnetic array positioned on the second side of the transparent material, wherein the third magnetic array and the fourth magnetic array are configured to couple together in a second single orientation.

13. The system of claim 12, wherein a relative position of the first optical unit and the second optical unit coupled in the first single orientation is defined by orientations of individual magnetic elements of the first magnetic array and the second magnetic array.

14. The system of claim 12, wherein:

the first coupling unit configured to couple the first optical unit to a housing unit, wherein the coupling unit is movably coupled to the first unit in at least one of an x-direction, a y-direction, or a z-direction.

15. The system of claim 14, wherein the first coupling unit is rigidly coupled to the first housing unit.

16. The system of claim 14, wherein:

the housing unit is a first housing unit;

the first housing unit is positioned on the first side of the transparent material; and the first housing unit further comprises a third magnetic array to couple with a fourth magnetic array associated with a second housing unit positioned on the second side of the transparent material.

17. The system of claim 14, further comprising a wireless power receiver coupled to the housing unit, the wireless power receiver configured to receive power from the second unit for operating the first optical unit.

18. The system of claim 12, wherein the transparent material is a window, and the first optical unit is mounted on an outside surface of the window and the second optical unit is mounted on an inside surface of the window.

19. The system of claim 12, wherein the first magnetic array is disposed symmetrically about the first optical sensor.

20. The system of claim 12, wherein the first unit further comprises:

a wireless power receiver to capture power from a wireless charging signal; and a first power supply coupled to the wireless power receiver to store power.

* * * * *